United States Patent
Dore et al.

(10) Patent No.: US 7,926,357 B2
(45) Date of Patent: Apr. 19, 2011

(54) RETROFITABLE PAVEMENT STRAIN GAUGE

(75) Inventors: Guy Dore, Sainte-Catherine-de-la-Jacques-Cartier (CA); Sylvain Juneau, Sainte-Augustin-de-Desmaures (CA); Pascale Pierre, Québec (CA)

(73) Assignee: Université Laval, Cité Universitaire Québec (Québec) (CA)

( * ) Notice: Subject to any disclaimer, the term of this patent is extended or adjusted under 35 U.S.C. 154(b) by 291 days.

(21) Appl. No.: 12/376,875

(22) PCT Filed: Aug. 9, 2007

(86) PCT No.: PCT/CA2007/001388
§ 371 (c)(1),
(2), (4) Date: Feb. 9, 2009

(87) PCT Pub. No.: WO2008/017158
PCT Pub. Date: Feb. 14, 2008

(65) Prior Publication Data
US 2010/0175485 A1   Jul. 15, 2010

Related U.S. Application Data

(60) Provisional application No. 60/836,361, filed on Aug. 9, 2006.

(51) Int. Cl.
*G01N 3/00* (2006.01)

(52) U.S. Cl. ......................................................... 73/803
(58) Field of Classification Search ...................... 73/803
See application file for complete search history.

(56) References Cited

U.S. PATENT DOCUMENTS

| 5,111,897 A | 5/1992 | Snyder et al. |
|---|---|---|
| 5,236,040 A * | 8/1993 | Venditto et al. ............. 166/250.1 |
| 6,318,185 B1 | 11/2001 | Aumard et al. |
| 7,694,579 B2 * | 4/2010 | Tonelli et al. .................... 73/803 |
| 2006/0117863 A1 | 6/2006 | Kim |

FOREIGN PATENT DOCUMENTS

WO   0127569   4/2001

OTHER PUBLICATIONS

G. Doré et al., "Monitoring pavement response during spring thaw using fiber-optic sensors", 6th International Conference on the Bearing Capacity of Roads and Airfields (CD-ROM), Jun. 24-26, 2002, Lisbon, Portugal.
P. Pascale et al., "Characterization of tire impact on the pavement behaviour", Can. J. Div. Eng. 31, 860-869, 2004 NRC, CA.

* cited by examiner

*Primary Examiner* — Lisa M Caputo
*Assistant Examiner* — Octavia Davis
(74) *Attorney, Agent, or Firm* — Ogilvy Renault, LLP

(57) ABSTRACT

There is provided a proof body for use in a strain gauge for measuring horizontal strains in a pavement. The proof body is to be inserted in a hole provided in a surface layer of the pavement. The proof body is designed to be embedded in a substitute core designed to be retrofitted in the hole. The proof body is designed to be attached to the walls of the hole, allowing measurement of horizontal strains in the pavement surface layer.

15 Claims, 6 Drawing Sheets

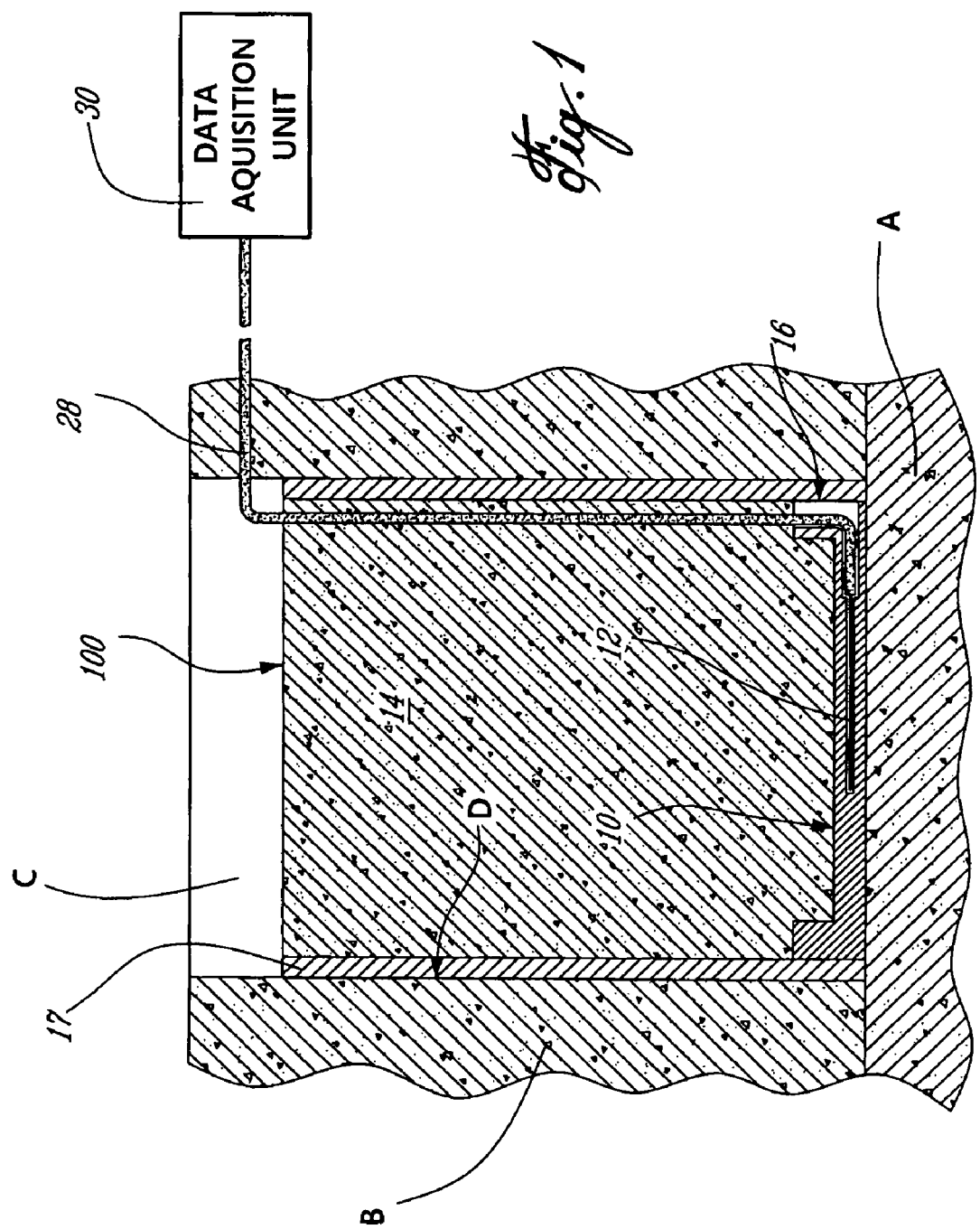

RETROFITABLE PAVEMENT STRAIN GAUGE

CROSS-REFERENCE TO RELATED APPLICATIONS

The present application claims priority of U.S. provisional patent application No. 60/836,361 filed on Aug. 9, 2006, the specification of which being hereby incorporated by reference.

TECHNICAL FIELD

This invention relates to the measurement of horizontal strains in pavements and more specifically at the bottom of the bound surfacing layers of pavement.

BACKGROUND

Road pavement typically includes a granular base and a bound surface layer made of asphalt or concrete. The interface between the surface layer and the granular base is considered to be one of the most important pavement interfaces. Horizontal (radial) strains at that level are considered to be directly related to the fatigue performance of the pavement structure.

Horizontal strains at the bottom of the pavement surface layer have been measured for several decades to support pavement mechanistic analysis and design. Two types of strain gauges have been used for that purpose. The first approach consist in placing an "H"-shaped gauge on top of the granular base prior to building of the surface layer (typically asphalt concrete or Portland cement concrete). The "H" shape of the proof-body allows proper anchoring of the gauge in the surfacing layer material for reliable measurements of horizontal strains. However, high mechanical and thermal stresses are imposed to the gauge by the compaction of the surface layer while the surfacing layer material is still hot. These stresses often result in gauge damage, displacement and misalignment.

The increasing need to investigate the mechanical response and performance of existing pavements has led to the development of another approach to strain measurements in existing pavement bound layers. The approach consist of coring existing pavements in order to reprocess a core of the surface layer which is glued back in its original position after a strain sensor is affixed to the bottom of the core. Several questions regarding the ability of the core to effectively transmit stresses of the surrounding surface layer to the sensor affixed to its base remain unanswered.

SUMMARY

There is provided a proof body system adapted for horizontal strain measurements in pavement surfacing layers. The proof-body is designed to be embedded in a core designed to be retrofitted in an existing pavement. The proof body is designed to be attached to the walls of the core hole allowing measurement of horizontal strains in the pavement surface layer with minimal disruption of the stress fields induced in the surface layer by moving vehicles.

One aspect of the invention provides a proof body for use in a strain gauge for measuring horizontal strains in a pavement, the proof body to be inserted in a core hole in a surface layer of said pavement. The proof body comprises a cavity adapted to receive a strain sensor for measuring an horizontal strain in said surface layer along a corresponding axis, such that strain induced in said proof body along said axis is transmitted to said strain sensor; and external end surface portions opposite from one another along said axis. The proof body is dimensioned to substantially fill an horizontal cross-section of said core hole along said axis such that said end surface portions are to adjoin an inside wall of said core hole.

Another aspect of the invention provides a strain gauge for measuring horizontal strains in a pavement. The strain gauge is to be embedded in a core hole in a surface layer of the pavement. The strain gauge comprising a strain sensor for measuring an horizontal strain in said surface layer along a corresponding axis and a proof body having a cavity to receive said strain sensor such that strain induced in said proof body along said axis is transmitted to said sensor, and external end surface portions opposite from one another along said axis said proof body being dimensioned to substantially fill an horizontal cross-section of said core hole along said axis such that said end surface portions are to adjoin an inside wall of said core hole. The strain gauge further comprising a substitute core made of a material having mechanical properties at least similar to a material of said surface layer to be instrumented, and receiving said proof body, said substitute core and said proof body together having dimensions complementary to said core hole such that said strain gauge substantially fills said core hole.

Another aspect of the invention provides a method for providing a strain gauge for measuring horizontal strains in the surface layer of a pavement, the strain gauge to be embedded in a core hole in a surface layer of said pavement. A first strain sensor is provided for measuring an horizontal strain in said surface layer along a first axis. A proof body is dimensioned such that said proof body substantially fills an horizontal cross-section of said core hole along said first axis. The first strain sensor is mounted to said proof body such that strain induced in said proof body along said first axis is to be transmitted to said first strain sensor. A substitute core of a material having mechanical properties at least similar to a material of said surface layer to be instrumented is prepared. The substitute core has, together with said proof body, dimensions complementary to said core hole. The proof body is mounted on said substitute core, thereby providing said strain gauge.

BRIEF DESCRIPTION OF THE DRAWINGS

FIG. 1 is a cross-sectional schematic view of a strain gauge system showed installed in a pavement;

DETAILED DESCRIPTION

Figure 2A:
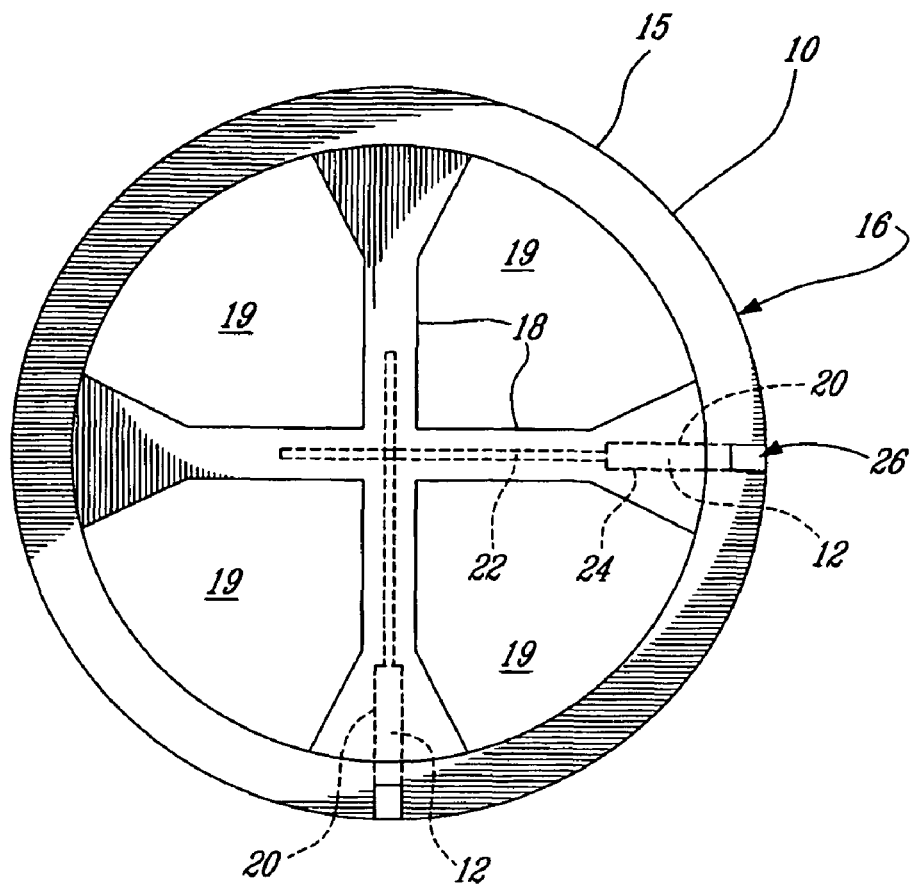
FIG. 2 includes FIG. 2A and FIG. 2B which are respectively a top plan view and a side view of an example of a proof body of the strain gauge system of FIG. 1, wherein the exterior flange of the proof body is continuous.

Now referring to the drawings, FIG. 1 shows a strain gauge 100 installed in a pavement for measuring horizontal strains in the pavement by embedding the strain gauge 100 in a core hole C performed in an existing pavement. A typical road pavement comprises a granular base A having a surface layer B on top. The strain gauge 100 measures strains at the interface of the granular surface A and the surface layer B. The core hole C has a depth which substantially corresponds to the thickness of the surface layer B such that the strain sensors 12 of the strain gauge 100 sit at the interface between the granular base A and the surface layer B of the pavement.

The strain gauge 100 is designed to hold two orthogonal strain sensors 12 in a proof body 10 that is attached directly to the wall of the core hole C. The proof body 10 is designed to be embedded at the bottom of a substitute core 14 which has a shape complementary to the core hole C. The proof body 10 and the substitute core 14 can then be glued into the core hole C in the existing pavement surface layer at the exact location and orientation required for the measurements. In this example, the strain gauge 100 is designed to be retrofitted in a core hole C having a small diameter, e.g. about 60 mm, such that the perturbation induced by the strain sensor 100 in the pavement surface layer to be instrumented is minimized.

The strain gauge 100 is designed to measure horizontal (radial or flexural) strains at the bottom of the bound surfacing pavement layers. The strain gauge 100 comprises two orthogonal fiber optic strain sensors 12 for measuring a horizontal strain in the surface layer B. Each strain sensors measures strains along its corresponding axis. The proof body 10 receives the strain sensors 12 which are glued therein such that strain induced in the proof body 10 along the axis of the strain sensor 12 is transmitted to the sensor 12. As can be seen in FIG. 1, the proof body 10 is dimensioned to fill the horizontal cross-section of the core hole C especially along the axis of the sensor 12. The external wall 16 of the proof body 10 thus adjoins the inside wall D of the core hole C on both opposite extremities along the axis of the sensor 12 such that the proof body 10 can be intimately joined to the inside wall D at those both extremities. Strains in the surface layer B are thus directly transmitted to the proof body 10 and consequently to the strain sensor 12.

The substitute core 14 is laboratory reconstituted and made of a material having mechanical properties similar to the material of the surface layer B in order to avoid a disturbance of the response of the pavement to road traffic loading due to the presence of the strain gauge 100 installed in the pavement. The proof body 10 is typically mounted to the bottom of the substitute core 14 so that the proof body 10 eventually sits at the bottom of the core hole C, and is glued to the substitute core 14 using compatible epoxy material. The substitute core 14 is designed to replace the core extracted from the surface layer. The substitute core 14 may be molded or mechanically carved to match the core hole C. The core may be carved from material sampled at the site to be instrumented, or can be reconstituted and molded using bound material having mechanical properties compatible to the material of the pavement surface layer, such as asphalt concrete, Portland cement concrete or other types of materials. The gauge 100 is affixed at the desired location in the core hole C by the glue joint 17. The gauge is placed and glued using compatible epoxy glue or other adhesive materials, such as cement glues.

Figure 2B:
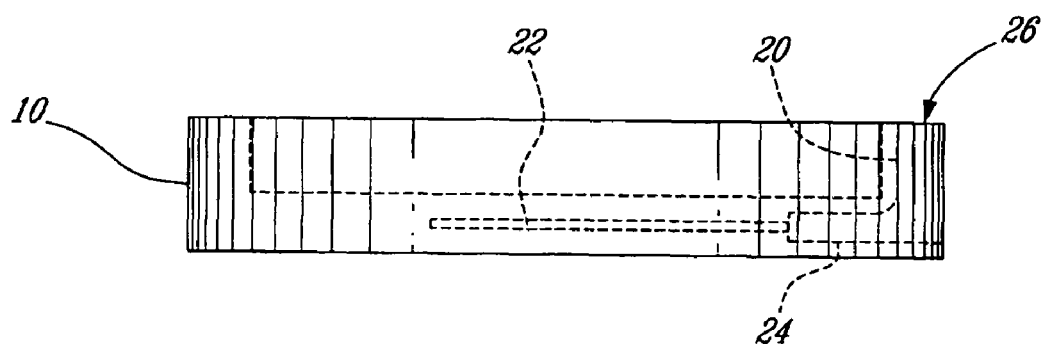

FIGS. 2A and 2B show an example of a proof body 10 adapted to receive two orthogonal fiber optic sensors 12 for measuring horizontal strain along two respective measurement axes, typically the longitudinal and the transversal horizontal axes of a roadway. The fiber optic strain sensors 12 are mounted and affixed in the proof body 10 such that strain induced to the proof body is transmitted to the strain sensor 12. The proof body 10 is preferably made of a polymeric plastic selected to have mechanical and thermal properties similar to the surrounding material in order to minimize perturbations to the stress fields around the gauge when the pavement is subjected heavy traffic loads. The proof body 10 should be made of a material which is homogeneous, and isotropic. The material should be sufficiently robust to protect the sensor 12 and have an elastic modulus near but lower than the surface layer bound material of the pavement. The shape of the proof body 10 is such that it allows direct attachment to the inside wall D of the core hole C, at both opposite ends of each sensor 12. In this example, the dimensions of the proof body substantially correspond to the dimensions of the cross-section of the core hole C.

The proof body 10 comprises a circular peripheral flange 15 which provides the external wall 16 that is to be glued in the inside wall D of the core hole C. In the example embodiment of FIG. 2, the outside diameter of the circular flange 15 corresponds to the inside diameter of the core hole C, with a small air gap for receiving an epoxy joint between the two. The proof body 10 also has two orthogonal and intersecting transverse members 18 disposed across the peripheral flange 15 and each having both ends joined to the peripheral flange 15. Each transverse member 18 has a longitudinal cavity 20 for receiving one of the strain sensors 12 and into which a strain sensor 12 is to be affixed. The two transverse members 18 and the peripheral flange 15 define four openings 19 in the proof body. The four openings 19 receive corresponding protrusions 48 (see FIG. 3) on the substitute core 14 for engagement of the proof body 10 at the bottom of the substitute core 14. Each cavity 20 has a thin and elongated fiber optic sensor receiving portion 22 into which the fiber optic sensor is to be inserted and glued. This portion has a cross-sectional diameter that fits the diameter of the fiber optic sensor 12. Longitudinally aligned to and connecting with the sensor receiving portion 22 is a cable receiving portion 24 which is larger to receive the optical cable which carries a light signal to the sensor 12. The cable receiving portion 24 connects with a cable opening 26 located at the periphery of the proof body 10, at one end of the transverse member 18. Referring back to FIG. 1, the cable 28 exiting the proof body 10 from the cable opening 26 runs along the substitute core 14 to exit the pavement for connection with a data acquisition unit 30 in order to perform and save the strain measurements. More precisely, a channel is also carved at the surface of the pavement to receive the cable 28 so that it reaches the acquisition unit 30 located off the road. The cable 28 is then covered using a bitumen, epoxy or silicone based material.

It is noted that the transverse members 18 carrying the strains sensors 12 have small cross-sections in order to minimize the perturbation of the mechanical response of the surface layer due to the introduction of the strain gauge 100. The flange 15 and the transverse members 18 are made of an integral piece of a polymeric material. In this example, the material used for the proof body 10 is polyethylene terephthalate. It is a thermoplastic polymer resin of the polyester family. The material is selected on the basis of its mechanical (similar elastic modulus) and thermal (similar coefficient of thermal expansion) compatibility with the pavement surface layer material. In addition, the material is compatible with epoxy glues used to affix the strain sensors 12 to the proof body 10 and the strain gauge 100 in the core hole C. The diameter of the proof body 10 is also minimized to avoid interference with stress fields.

Figure 3:
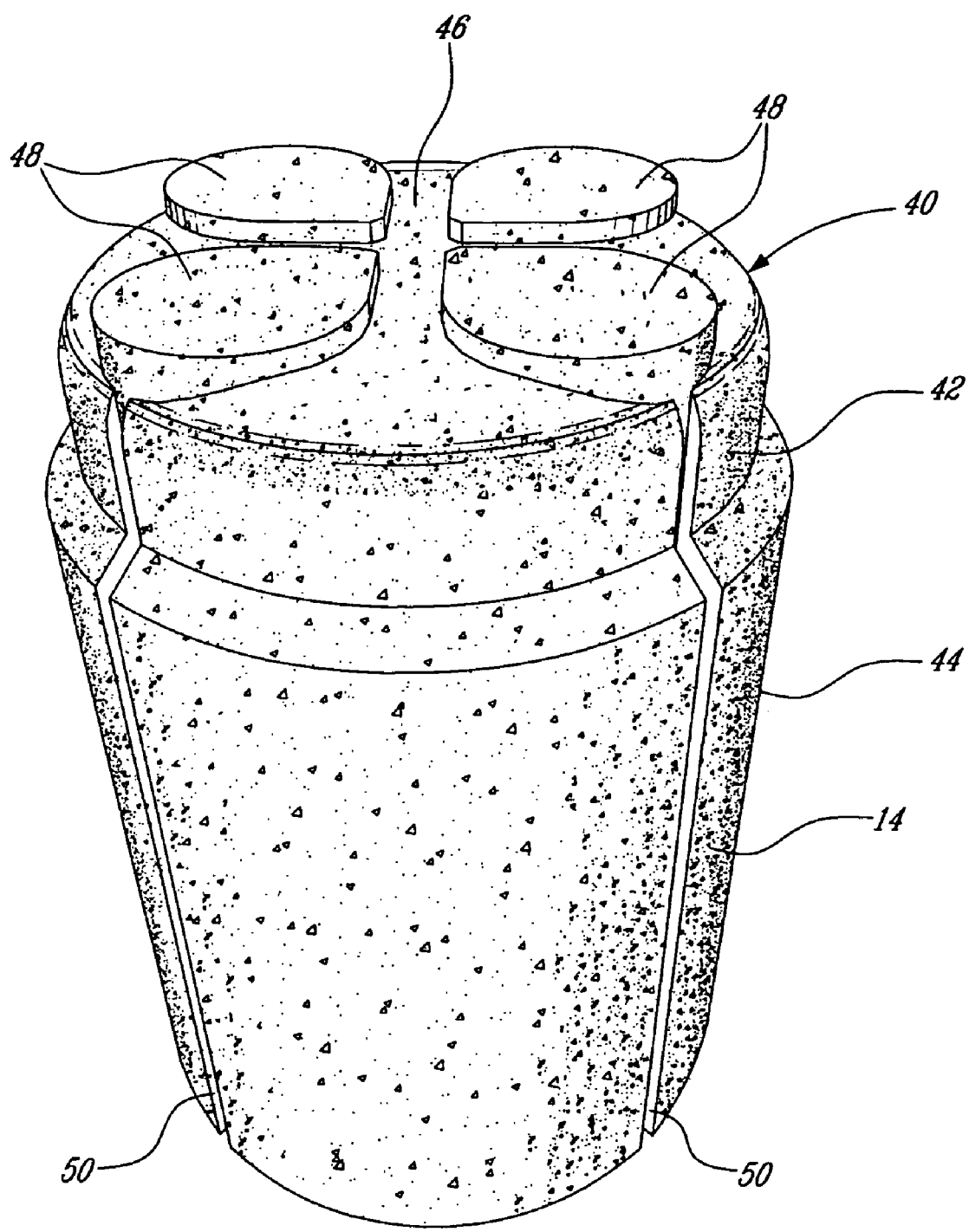
FIG. 3 is an isometric view of an example of a reconstituted core of the strain gauge system of FIG. 1.

FIG. 3 shows the substitute core 14 turned upside down. The substitute core 14 has a substantially cylindrical shape to fit in the core hole C. The cylinder has a proof body receiving end 40 which consists of a peripheral depression 42 which fits within the space defined by the flange 15 of the proof body 10. The proof body receiving end 40 has a cross-like recess 46 for receiving the transverse members 18 and which defines four protrusions 48 for receiving the complementary four openings 19 in the proof body 10. Along the external wall 44 of the cylinder-shaped substitute core 14 are two groves 50 extending from the bottom to the top of the strain gauge 100 and aligned with the cable openings 26 of the proof body, for receiving the two fiber optic cables 28 connecting the fiber optic sensors 12 to the data acquisition unit 30.

Each fiber optic strain sensor 12 is mounted and glued in its respective cavity 20 on an orthogonal member 18. The proof body is dimensioned such that it substantially fills an horizontal cross-section of the core hole along each strain sensor axis. The substitute core 14 is prepared. If material from the site to be instrumented is used for preparing the substitute core 14, the material is cored and carved to fit the instrumented core hole C and to encrust the proof body 10. If new material is used, the material should have mechanical properties (stiffness and density) compatible with the bound surfacing material to be instrumented and compacted in a special mold designed to fit the instrumentation core hole C and to receive the proof body 10. In the molding process, a channel 22 is grooved on the side of the core 14 for receiving the fiber optic cable 28. The peripheral flange 15 of the proof body 10 is then used to mount and affix the proof body 10 to the bottom of the core 14 by gluing the core 14 inside the flange 15. The provided strain gauge 100 is then ready to be retrofitted and glued the core hole C bored into the bound surfacing material.

Despite the fact that electric strain gauges can also be used for the proposed application, fiber optic sensors are selected herein due to their insensitivity to water, frost action and electric fields. The strain gauge 100 uses commercially available fibre optic sensing technology. In this case, the OSP™ strain sensors manufactured by OPSENS inc. are used. These sensors use white-light interferometry Fabry-Perot technology and consist of two optical fibers that are precisely aligned inside a microcapillary tube to form an optical Fabry-Pérot interferometer.

The strain sensors 12 are conditioned and acquisitioned using a high frequency (>500 Hz) data acquisition unit 30 which is commercially available and comprises integrated light source, optical detection unit, control unit, modular signal conditioner, data acquisition and data storage unit. In this case, the data acquisition unit 30 is the PROSENS™ system manufactured by OPSENS inc.

Three different epoxy glues are used to assemble the pavement strain gauge 100. The first one, e.g. M-Bond™ AE-10 commercialized by VISHAY, is used to fix the fiber optic sensor 12 in the proof body 10. It is very stiff glue that is chemically compatible with the optical fiber of the sensor 12 and the material of the proof body 10, polythene teraphthalate in this case. The second epoxy glue, e.g. Sika Anchorfix®-4 commercialized by SIKA, is used to fix the proof body 10 to the substitute core 14, made of asphalt concrete in this case. This glue is selected to be chemically compatible with both materials, namely asphalt concrete and polyethylene teraphthalate in this case, while being slightly softer than these materials in order to avoid disturbance of the stress field around the strain sensor 10. The third epoxy glue, e.g. Sikadur®-52 commercialized by SIKA, is used to affix the strain gauge 100 inside the core hole C in the surface layer A. It is selected to be chemically compatible with the proof body material and also with the surface layer material and substitute core material. This glue is slightly stiffer than these materials in order to assure full transmission of stress between the pavement surface layer and the strain gauge 100.

Figure 4B:
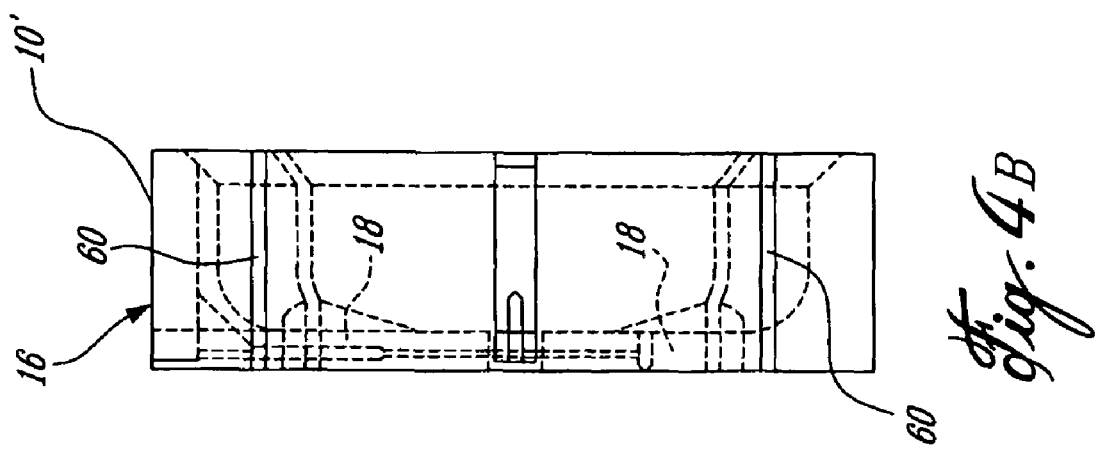
FIG. 4 includes FIG. 4A and FIG. 4B which are respectively a top plan view and a side view of another example of a proof body of the strain gauge system of FIG. 1, wherein the exterior flange of the proof body is discontinued.
Figure 4A:
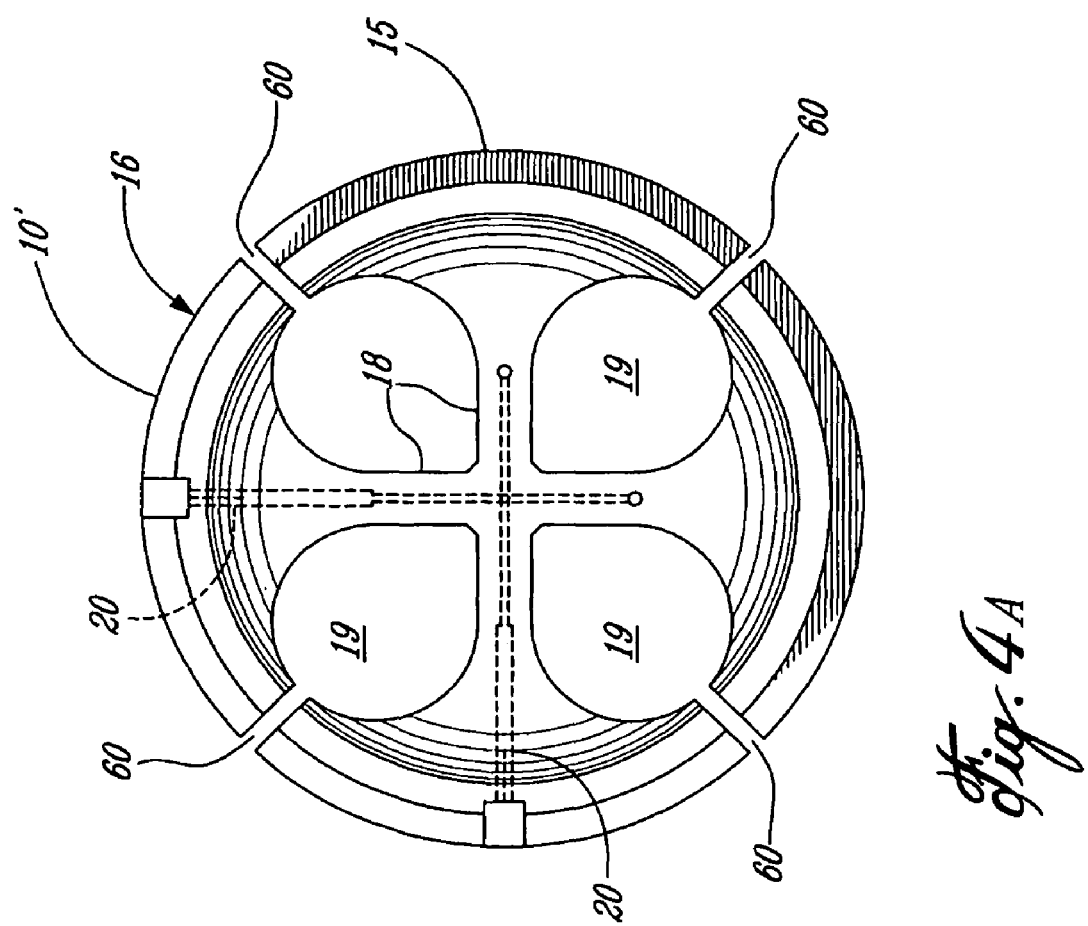

FIGS. 4A and 4B show another example of a proof body 10' adapted to receive two orthogonal fiber optic sensors 12 (not shown). The proof body 10' is similar to the proof body 10 of FIG. 2 except for its peripheral flange 15 which is discontinuous between ends of the transverse members 18 in order to mechanically decouple the two transverse members 18 thereby reducing the interference between strains along both measurement axes. The flange 15 then consists of four segments of a circle linked only by the transverse members 18 which intersect in the middle of the proof body 10'. This embodiment provides an independent response of the two strain sensors 12 such that strains measured along the two axes are independent from one another. Accordingly, four gaps 60 are introduced on the circular peripheral flange 15 in order to separate the flange 15 into four independent segments of a circle. Each gap 60 is located midway between two points where a transverse member 18 intersects the flange 15. Each gap 60 completely separates two adjacent segments of the flange such that each opening 19 connects with the outside of the proof body 10'.

It is noted that the gaps 60 are herein chosen to have a small width for preserving the maximum possible contact surface between the flange 15 of the proof body 10' and the inside wall D of the core hole C. However, the gaps may also be made larger. The flange 15 may occupy most of periphery of the proof body 10' or may also occupy less than 50% of the periphery of the proof body 10'.

Example: According to one specific example, the proof body 10' is designed to be installed in a core hole C having a cross-section diameter of 56.6 mm, and has a diameter of 54.6 mm, leaving a 1 mm gap around the gauge 100 for receiving a glue joint 17. The four gaps 60 each have a width of 1.575 mm, which corresponds to less than 1% of the circumference of the proof body 10'.

The strain gauge 100 of FIG. 1 is adapted to measure horizontal strains at the interface between the granular base A and the surface layer B of pavement. However, it is noted that the strain gauge may also be adapted to measure horizontal strains at any other level in the surface layer. In this case, the core hole C may simply be made less deep so that it does not reach the granular base A but rather ends at the level at which the measurement is to be made. The core hole C may also reach the granular base A while the proof body is stacked between two layers of substitute core so that the strain gauge still fills the core hole C with the proof body lying at the level at which the measurement is to be made.

Figure 5:
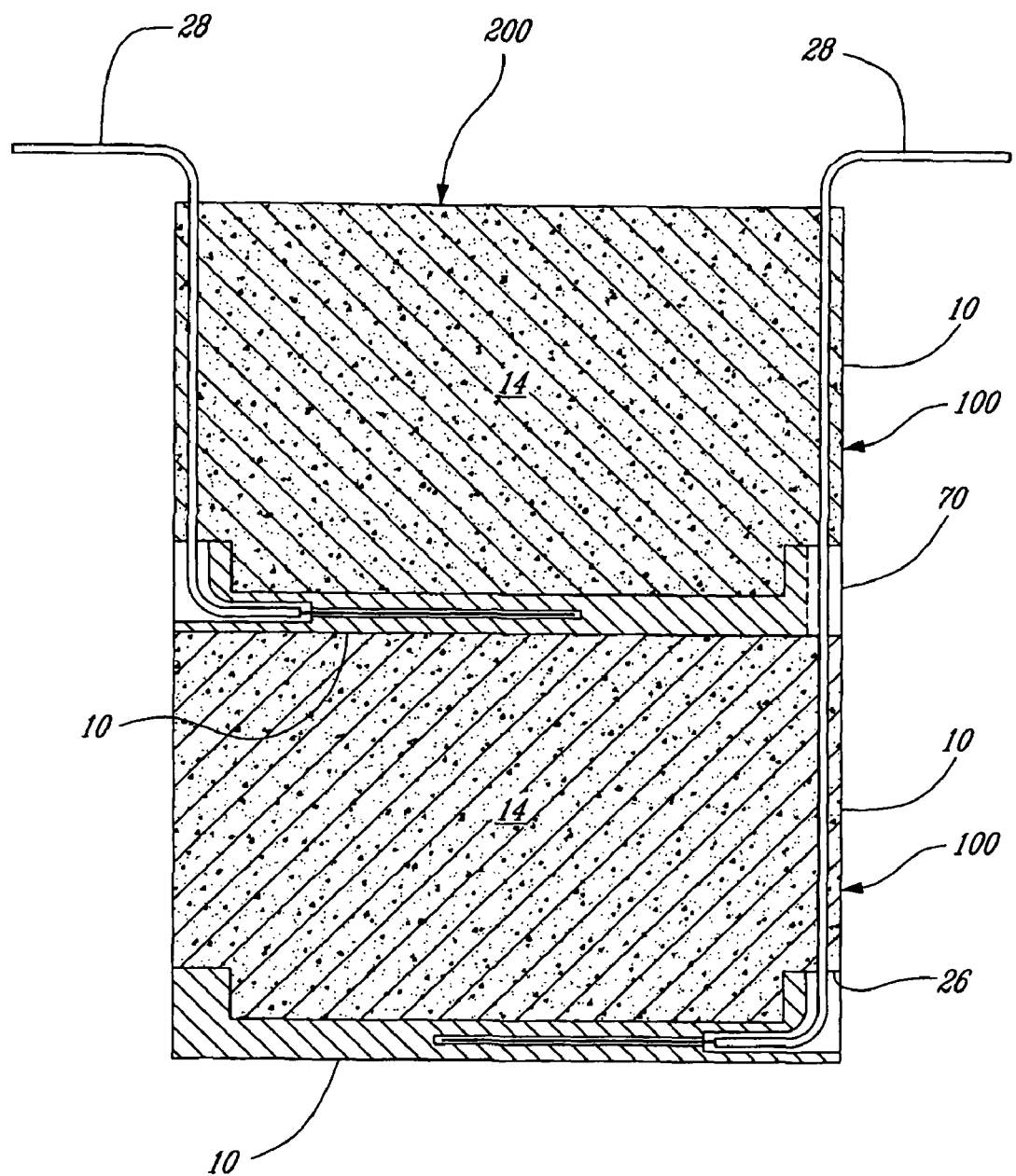
FIG. 5 is a cross-sectional view of another example strain gauge comprising two proof bodies stacked on top of one another, separated by a substitute core.

FIG. 5 shows another example of a strain gauge 200 which comprises two proof bodies 10 and two substitute cores 14 stacked one on the top of the other to build an assembly which is equivalent to stacking two strain gauges 100. The strain gauge 200 allows the measurement of horizontal strain at multiple levels in the surface layer B. More than two proof bodies 10 may also be stacked similarly. In the strain gauge 200, the two proof bodies 10 are disposed with a 180° angle from one another so that the two fiber optic cables 28 of the bottom proof body 10 do not interfere with the fiber optic cables of the top proof body 10 while the measurement axes of the two proof bodies 10 are aligned. The top proof body 10 also has two channels 70 on its flange 15 aligned with the two cable openings 26 of the bottom proof body 10 for allowing the cables 28 to pass through the proof body 10.

The core hole C is selected herein to be cylindrical for easy boring of the pavement surface layer B. However, the cross-sectional shape of the core hole C may vary. For example, a square shaped cross-section hole provided in the pavement could be used instead of the core hole C. In this case, the shape of the proof body should be adapted to the cross-section of the hole. For example, a square shaped flange may be provided, the transverse members then intersecting with the sides of the square flange.

According to another example, the proof body is provided as consisting of two orthogonal and intersecting transverse members which are joined at the intersection, both ends of each transverse members ending with a "T"-shape flange portion, thereby defining a cross potent shape. Each "T"-shape end has an external surface that is to adjoin the sidewall of the core hole for attaching the proof body in the core hole.

Figure 6A:
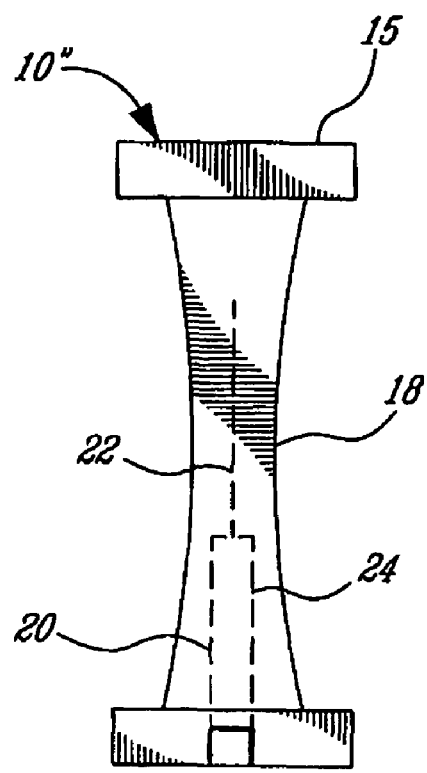
FIG. 6 includes FIG. 6A and FIG. 6B which are respectively a top plan view and a side view of still another example of a proof body of the strain gauge system of FIG. 1, wherein the proof body is "I"-shaped and receives a single strain sensor for measuring strain along a single axis.
Figure 6B:
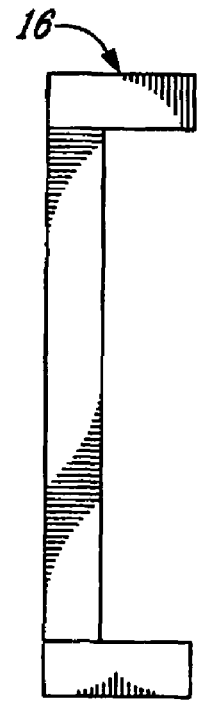

It is noted that the number of strain gauges, and consequently the number of transverse members, may vary. For example, the proof body may be shaped in a "I"-like manner, the main member defining the transverse member 18 and receiving a single strain sensor, and the end strokes of the "I" providing flange sections 15 for attachment of the proof body to the inside wall D of the core hole C. Such a proof body 10" for measuring strain along a single axis is illustrated in FIG. 6. The proof body 10" illustrated in FIG. 6 has flanges 15 with a flat external wall surface 16 for attachment in a square or rectangular shaped hole. The flanges 15 may also be shaped as segments of circles in order to fit a circular cross-section core hole.

The strain gauge can be adapted to different pavement surfacing materials including all types of asphalt concrete including hot mix asphalt concrete, cold mix asphalt concrete, recycled asphalt concrete, stone mastic asphalt, and other types of asphalt concretes and asphalt emulsion bound material; all types of cement concrete including Portland cement concrete, recycled cement concrete, lean concrete, cement stabilized materials and other type of cement bound materials; and other types of bound pavement materials including surfacing layers and base layers.

When assembled and installed in a pavement structure as described, the gauge allows for measurements of horizontal strains at the bottom of bound layers. This response parameter is frequently used as a basic response criterion for pavement mechanistic design and analysis.

The embodiments of the invention described above are intended to be exemplary only. The scope of the invention is therefore intended to be limited solely by the scope of the appended claims.

What is claimed is:

1. A proof body for use in a strain gauge for measuring horizontal strains in a pavement, the proof body to be inserted in a hole provided in a surface layer of said pavement, said proof body comprising:
    a cavity adapted to receive a strain sensor for measuring an horizontal strain in said surface layer along a corresponding axis, such that strain induced in said proof body along said axis is transmitted to said strain sensor; and
    external end surface portions opposite from one another along said axis, said proof body being dimensioned to substantially fill an horizontal cross-section of said hole along said axis such that said end surface portions are to adjoin an inside wall of said hole.

2. The proof body as claimed in claim 1, wherein said proof body comprises two orthogonal cavities to receive two orthogonal strain sensors respectively corresponding to two orthogonal axes, said proof body being dimensioned to substantially fill said cross-section of said hole along each one of said axes such that external end surface portions opposite from one another along one of said axes and external end surface portions opposite from one another along the other one of said axes are to adjoin said inside wall of said hole.

3. The proof body as claimed in claim 2, wherein said proof body comprises:
    a peripheral flange dimensioned to adjoin said inside wall of said hole and comprising said external end surface portions; and
    two orthogonal and intersecting members each having both ends joined to said peripheral flange, each one of said members being disposed along one of said orthogonal axes and receiving one of said orthogonal cavities.

4. The proof body as claimed in claim 3, wherein said peripheral flange is discontinuous between said ends of said members so that strains along said members are decoupled from one another in said proof body.

5. A strain gauge for measuring horizontal strains in a pavement, the strain gauge to be embedded in a hole provided in a surface layer of said pavement, the strain gauge comprising:
    a strain sensor for measuring an horizontal strain in said surface layer along a corresponding axis;
    a proof body having:
    a cavity to receive said strain sensor such that strain induced in said proof body along said axis is transmitted to said sensor, and
    external end surface portions opposite from one another along said axis said proof body being dimensioned to substantially fill an horizontal cross-section of said hole along said axis such that said end surface portions are to adjoin an inside wall of said hole; and
    a substitute core made of a material having mechanical properties at least similar to a material of said surface layer to be instrumented, and receiving said proof body, said substitute core and said proof body together having dimensions complementary to said hole such that said strain gauge substantially fills said hole.

6. The strain gauge as claimed in claim 5, further comprising a fastener for fastening said proof body directly on said inside wall of the hole.

7. The strain gauge as claimed in claim 6, wherein said fastener comprises epoxy glue.

8. The strain gauge as claimed in claim 5, wherein said strain gauge comprises two orthogonal strain sensors respectively corresponding to two orthogonal axis, strain induced in said proof body along each one of said axes to be transmitted to its corresponding strain sensor, said proof body being dimensioned to horizontally fill said cross-section of said hole along each one of said axes.

9. The strain gauge as claimed in claim 8, wherein said proof body comprises a peripheral flange dimensioned to adjoin said inside wall of said hole, and two orthogonal and intersecting members each having both ends joined to said peripheral flange, each one of said members being disposed along one of said orthogonal axes and receiving one of said strain sensors.

10. The strain gauge as claimed in claim 9, wherein said peripheral flange is discontinuous between said ends of said members so that strains along said members are decoupled from one another in said proof body.

11. The strain gauge as claimed in claim 5, wherein said strain sensor comprises a fiber optic sensor based on Fabry-Perot interferometry.

12. The strain gauge as claimed in claim 5, wherein said substitute core comprises a caved core.

13. A method for providing a strain gauge for measuring horizontal strains in the surface layer of a pavement, the strain gauge to be embedded in a hole provided in a surface layer of said pavement, the method comprising:
- providing a first strain sensor for measuring an horizontal strain in said surface layer along a first axis;
- dimensioning a proof body such that said proof body substantially fills an horizontal cross-section of said hole along said first axis;
- mounting said first strain sensor to said proof body such that strain induced in said proof body along said first axis is to be transmitted to said first strain sensor;
- preparing a substitute core of a material having mechanical properties at least similar to a material of said surface layer to be instrumented, and having, together with said proof body, dimensions complementary to said hole;
- mounting said proof body on said substitute core, thereby providing said strain gauge.

14. The method as claimed in claim 13, further comprising:
- providing a second strain sensor for measuring an horizontal strain in said surface layer along a second axis orthogonal to said first axis; and
- mounting said second strain sensor in a proof body such that strain induced in said proof body along said second axis is to be transmitted to said second strain sensor; and
- wherein said proof body is dimensioned such that said proof body substantially fills an horizontal cross-section of said hole also along said second axis.

15. The method as claimed in claim 13, further comprising:
boring said hole in the pavement surface layer;
fastening said strain gauge inside said hole such that external end surface portions of said proof body, which are opposite from one another along said first axis, are fasten directly on an inside wall of said hole.

\* \* \* \* \*